Oct. 13, 1942.     K. E. McCONNAUGHAY     2,298,495
MIXING MACHINE
Filed Oct. 5, 1940

INVENTOR.
KENNETH E. McCONNAUGHAY,
BY
ATTORNEYS

Patented Oct. 13, 1942

2,298,495

UNITED STATES PATENT OFFICE 2,298,495

MIXING MACHINE

Kenneth E. McConnaughay, West Lafayette, Ind.

Application October 5, 1940, Serial No. 359,830

9 Claims. (Cl. 259—12)

My invention relates to a mixing machine which will constitute a substitute for and an improvement over the ordinary type pug-mill mixer. A pug-mill mixer comprises an elongated trough and one or more rotatable shafts which extend longitudinally of the trough and which carry helically disposed blades. As the shafts rotate the helical disposition of the blades causes material in the trough to be fed therealong, while the rotation of the blades mixes the material.

In the type of pug-mill mixer such as has just been described, both the material-feeding function and the material-mixing function are performed by the same helically inclined blades. For most uses, the helically inclined blades are highly inefficient as a material-moving means; and, as a result, an unduly large amount of power is consumed in the mere operation of feeding material along the trough. Moreover, since the material-feeding and material-mixing operations are performed by the same means, the extent of the mixing can not be varied independently of the speed with which the material being mixed progresses along the trough.

It is the object of my invention to produce a mixer which will be free from the disadvantages possessed by pug-mill mixers. More specifically, it is my object to produce a mixer in which the feeding of the material and the mixing of the material are respectively performed by independent means and to decrease greatly the amount of power required to move material through the machine.

In carrying out my invention I perform the mixing operation through the use of a rotatable shaft provided with a multiplicity of axially and circumferentially spaced mixing blades or teeth which are adapted to move into and out of material being mixed as the shaft rotates. In addition to, and as a separate element from, the mixer I employ means for continuously moving material past the mixer as it rotates. In most instances, the direction in which material is moved past the mixer will be transverse to the axis about which the mixer rotates, but my invention is not limited to this particular arrangement.

Figure 1:
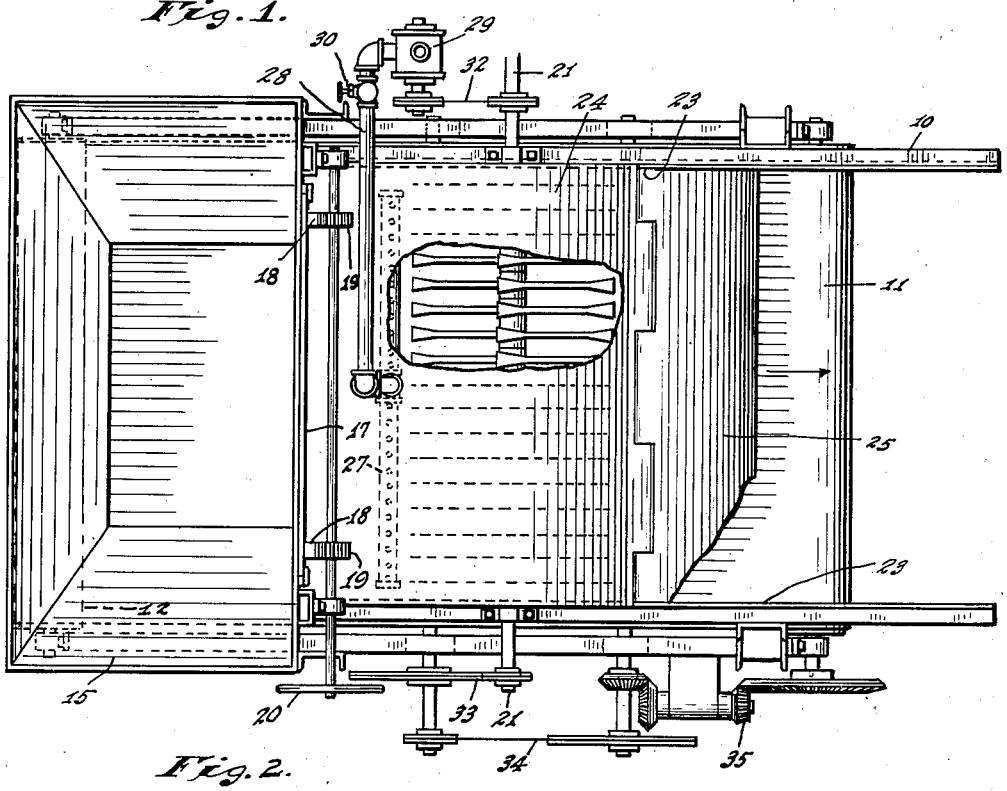
Figure 2:
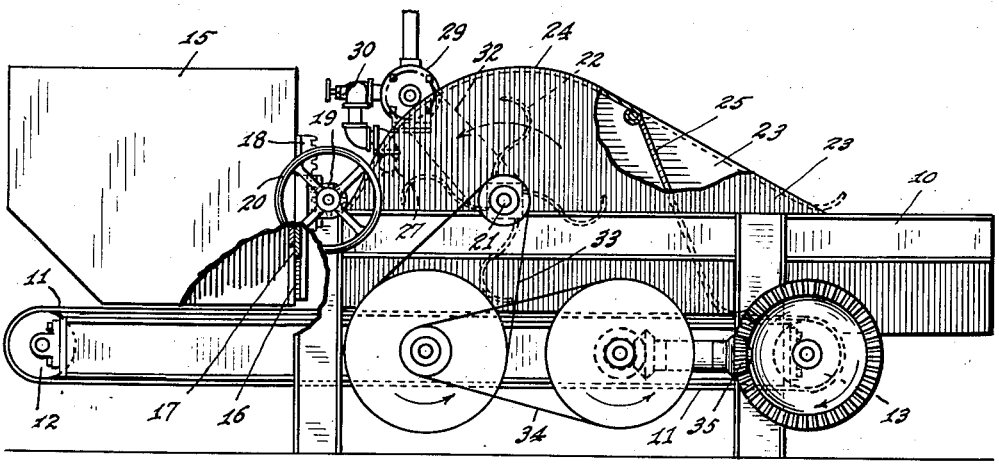

The accompanying drawing illustrates my invention: Fig. 1 is a plan view of a stationary mixing machine through which the materials to be mixed are moved and discharged in mixed condition at one end of the machine; and Fig. 2 is a side elevation of the machine shown in Fig. 1.

The machine shown in the drawing comprises a supporting frame 10 upon which is mounted a generally horizontally extending belt conveyor 11 disposed around rollers 12 and 13 near opposite ends of the frame. Mounted on the frame 10 near the roller 12 is a hopper 15 having an open bottom disposed immediately above the upper stretch of the conveyor 11 and also having in its rear wall an opening 16 through which material may be fed from the hopper as the conveyor 11 is moved. The effective size of this opening can be varied to regulate the rate at which material is fed from the hopper by means of a vertically sliding gate 17 controlled through the medium of racks 18 co-operating with pinions 19 which are rotatable by a hand wheel 20.

Mounted on the frame of the machine in rear of the hopper 15 is a transverse shaft 21 which extends across the machine above the upper stretch of the conveyor 11. The shaft 21 carries a plurality of series of circumferentially spaced mixing blades 22 which project generally radially from the shaft 21 to such an extent that in their rotation their outer ends move in proximity to the upper stretch of the conveyor 11. Desirably, the outer ends of the teeth 22 are curved so as to be concave forwardly with respect to the direction in which the shaft 21 rotates, as will be clear from Fig. 2.

The shaft 21 and the mixing blades 22 are enclosed within a housing comprising side walls 23 and a curved top wall 24. The curved top wall 24 terminates well above the upper stretch of the belt conveyor 11, and at the rear edge of the top wall there is pivotally mounted an extension or flap 25 which, under the influence of gravity, can drop downwardly until its free edge engages the upper stretch of the belt conveyor 11, as indicated in full lines in Fig. 2.

The machine illustrated, which is intended to mix aggregate and a liquid bituminous binder to form a paving composition, is provided within the housing 23—24 with a transversely extending spray bar 27 through which the liquified binder may be sprayed upon aggregate fed from the hopper 15 before such aggregate reaches the mixer 22. The spray bar 27 is supplied with binder through a pipe 28 leading from the discharge opening of a pump 29 connected to a suitable supply of binder. The pipe 28 may contain a valve 30 for regulating the rate of binder-flow.

The shaft 21 is adapted at one end for connection to a suitable source of power (not shown) and is in turn operatively connected to the pump 29 and the conveyor-roll 13. The connection of the shaft 21 to the pump 29 is shown as effected through the medium of a chain drive 32 disposed on one side of the machine; while the means employed to connect the shaft 21 with the drive roll 13 of the belt conveyor 11 is disposed at the opposite side of the machine. This latter means is speed-reducing and reversing in character, so that the roll 13 rotates at a speed materially less than that of the mixer shaft 21 and in the opposite direction. As shown, the roll-driving means comprises a pair of speed-reducing chain drives 33 and 34 and a reversing bevel-gear drive 35; but it will be understood that other forms of speed-reducing mechanism may be used if desired.

In the operation of the machine, the mixer element 21—22 is operated at a relatively high rate of speed—say in the neighborhood of 300 to 600 revolutions per minute—while the belt conveyor moves relatively slowly—say at about one one-hundredth of the linear speed of the tips of the mixing teeth 22. As the conveyor moves, aggregate from the hopper 15 is fed on the conveyor belt at a rate determined by the elevation of the gate 17. As it passes the spray bar 27, such aggregate receives a supply of liquid binder with which it is thoroughly mixed by the rapidly rotating mixer blades 22. When the machine begins to operate, the free edge of the flap 25 is resting on the conveyor 11 and thus prevents the aggregate particles thrown by the rapidly rotating mixer blades from escaping from the housing 23—24. However, as the conveyor 11 continues to operate more and more aggregate is fed into the housing 23—24 and, when enough aggregate is accumulated on the conveyor 11 against the flap 25, the free edge of the flap swings rearwardly and upwardly to permit the aggregate to move with the conveyor and to be discharged therefrom as the conveyor passes around the roll 13.

Because of the curved shape of the mixing blades 22, the aggregate particles struck by the blades as they rotate are for the most part not thrown directly rearwardly against the flap 25 but instead are thrown generally upwardly, or even upwardly and forwardly, so that as they rebound from the curved upper wall 24 of the housing they will be returned to the conveyor in the vicinity of the mixer. As a result, substantially every aggregate particle fed into the housing from the hopper 15 will be engaged several times by the mixer before it is carried out of the range of the rotating mixing blades by movement of the belt conveyor. In consequence, the materials are thoroughly mixed.

It will be noted from the above description that the mixing operation is performed by the mixer 21—22, while the operation of conveying material through the mixer is performed by the belt conveyor 11. The belt conveyor 11 is relatively efficient as a material-moving means; and, as a result, I am enabled to obtain a thorough mixing of materials with considerably less power than is required to mix them in a pugmill mixer.

I claim as my invention:

1. In a mixing machine for mixing a bituminous paving composition, a belt conveyor having a generally horizontal upper stretch, an aggregate hopper mounted immediately above the upper stretch of said conveyor and having an open bottom, the rear wall of said aggregate hopper having an opening at its bottom through which aggregate will be fed from the hopper by movement of the conveyor, means for regulating the size of said opening, a mixer housing disposed above said conveyor in rear of said hopper, a transverse shaft disposed within said housing above said conveyor, a plurality of series of circumferentially spaced mixing teeth mounted on said shaft in such a position that they will engage aggregate on the upper stretch of said conveyor as the shaft rotates, said housing having a rear wall-portion hingedly mounted at its upper edge and freely swingable downwardly into close association with said conveyor to prevent aggregate from being thrown from the housing by the action of said mixing teeth, a spray bar within said housing for delivering liquid bituminous binder, and means for moving said conveyor to convey aggregate from said hopper through said housing and for rotating said shaft to cause the outer ends of the mixing teeth adjacent the conveyor to move in the same direction as the conveyor but at a speed which is much higher than that of the conveyor and great enough to cause material on the latter to be thrown upwardly against said housing.

2. The invention set forth in claim 1 with the addition that said mixing teeth are concave forwardly in respect to the direction of their rotation.

3. In a mixing machine, a belt conveyor, a mixer housing disposed above said conveyor, a mixing element disposed within said housing and rotatable about an axis transverse to the direction of conveyor movement, said mixing element having a plurality of series of circumferentially spaced mixing teeth positioned so that their outer ends will engage material on said conveyor, said housing having a rear wall-portion hinged at its upper edge and freely swingable downwardly into close association with said conveyor to prevent material from being thrown from the housing by the action of said mixing teeth as they rotate, and means for moving said conveyor to convey material upon it through said housing and for rotating said mixing element to cause the outer ends of said mixing teeth adjacent the conveyor to move in the same direction as the conveyor but at a speed which is much higher than that of the conveyor and great enough to cause material on the latter to be thrown upwardly against said housing.

4. In a mixing machine, a belt conveyor, a mixer housing disposed above said conveyor, a mixing element disposed within said housing and rotatable about an axis transverse to the direction of conveyor movement, said mixing element having a plurality of series of circumferentially spaced mixing teeth positioned so that their outer ends will engage material on said conveyor, and means for moving said conveyor to convey material upon it through said housing and for rotating said mixing element to cause the outer ends of said mixing teeth adjacent the conveyor to move in the same direction as the conveyor but at a speed which is much higher than that of the conveyor and great enough to cause material on the latter to be thrown upwardly against said housing, said housing extending over said mixing element and being shaped to cause material so thrown against it to rebound into association with said mixing element.

5. The invention set forth in claim 4 with the addition that said mixing teeth are concave forwardly in respect to the direction of their rotation.

6. In a mixing machine, a belt conveyor, a mixer housing disposed above said conveyor, a rotatable mixing element mounted within said housing, said mixing element having a plurality of circumferentially spaced mixing teeth positioned so that their outer ends will engage material on said conveyor, and means for moving said conveyor to convey material thereon through said housing and for rotating said mixing element at a speed such that the linear velocity of the outer ends of the mixing teeth will be many times the velocity of the conveyor and high enough to cause the material on said conveyor to be thrown generally upwardly to impinge violently upon the wall of said housing, said housing extending over said mixing element and being shaped to cause material so thrown against it to rebound into association with said mixing element.

7. The invention set forth in claim 6 with the addition that said mixing teeth are concave forwardly in respect to the direction of their rotation.

8. In a mixing machine, a mixer housing a rotatable mixer element disposed within said housing, means for feeding the material to be mixed through the lower portion of said housing, said mixing element being provided with a plurality of circumferentially spaced mixing teeth positioned to engage material being fed through said housing by said feeding means, and means for rotating said mixing element to cause the outer ends of said mixing teeth to move with a linear velocity many times that at which the material to be mixed is fed by said feeding means and high enough to cause said material to be thrown generally upwardly to impinge violently upon the wall of said housing, said housing extending over said mixing element and being shaped to cause material so thrown against it to rebound into association with said mixing element.

9. In a mixing machine, a mixer housing, a rotatable mixer element disposed within said housing, means for feeding the material to be mixed through the lower portion of said housing, said mixing element being provided with a plurality of circumferentially spaced mixing teeth positioned to engage material being fed through said housing by said feeding means, the axis of rotation of said mixing element being transverse to the direction in which the material to be mixed is fed by said feeding means, said housing having a rear wall-portion hinged at its upper edge and freely swingable downwardly into close association with said feeding means to prevent the escape from the housing of material thrown by said mixing teeth, and means for rotating said mixing element to cause the outer ends of said teeth to move in the same direction as that in which the material to be mixed is fed but at a linear speed many times as great and high enough to cause material being acted upon by said feeding means to be thrown violently against the walls of said housing.

KENNETH E. McCONNAUGHAY.